(12) United States Patent
Song et al.

(10) Patent No.: US 12,498,533 B2
(45) Date of Patent: Dec. 16, 2025

(54) LENS SPACERS FOR LENS STABILITY

(71) Applicant: Meta Platforms Technologies, LLC, Menlo Park, CA (US)

(72) Inventors: Wanyue Song, San Jose, CA (US); Woong Hwang, Ansan-Si (KR); Yunhui Ni, Saratoga, CA (US); Zheng Sun, San Jose, CA (US); Youngshik Yoon, Cupertino, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 619 days.

(21) Appl. No.: 17/933,951

(22) Filed: Sep. 21, 2022

(65) Prior Publication Data

US 2023/0129204 A1    Apr. 27, 2023

Related U.S. Application Data

(60) Provisional application No. 63/271,840, filed on Oct. 26, 2021.

(51) Int. Cl.
*G02B 7/02* (2021.01)
(52) U.S. Cl.
CPC .................................. *G02B 7/021* (2013.01)
(58) Field of Classification Search
CPC .......... G02B 7/02; G02B 7/021; G02B 7/022; G02B 7/023; G02B 7/026
See application file for complete search history.

(56) References Cited

U.S. PATENT DOCUMENTS

| 10,742,854 | B2 * | 8/2020 | Wei | .................. | G02B 5/005 |
| 2007/0211353 | A1 * | 9/2007 | Lin | .................. | G02B 7/025 |
| | | | | | 359/811 |
| 2009/0279191 | A1 * | 11/2009 | Yu | .................. | G02B 7/022 |
| | | | | | 359/819 |
| 2011/0102901 | A1 | 5/2011 | Lin | | |
| 2012/0314288 | A1 * | 12/2012 | Lai | ................ | G02B 13/0035 |
| | | | | | 359/503 |
| 2022/0146777 | A1 * | 5/2022 | Inaba | ................ | G02B 7/025 |

OTHER PUBLICATIONS

Invitation to Pay Additional Fees for International Application No. PCT/US2022/047803, mailed Feb. 6, 2023, 11 pages.
International Search Report and Written Opinion for International Application No. PCT/US2022/047803, mailed Mar. 27, 2023, 16 pages.

* cited by examiner

*Primary Examiner* — Ephrem Z Mebrahtu
(74) *Attorney, Agent, or Firm* — Greenberg Traurig, LLP

(57) ABSTRACT

Spacers for lens apparatuses are provided. In some embodiments, a spacer comprises: an inner circumference and an outer circumference; and one or more angled vertical components, each positioned along the outer circumference. The spacer may be configured to be positioned between two lenses of the lens apparatus. A region within the inner circumference may be configured to allow light to pass between the two lenses. An angled vertical component of the one or more angled vertical components may be positioned against an angled surface of at least one of the two lenses.

20 Claims, 9 Drawing Sheets

LENS SPACERS FOR LENS STABILITY

RELATED APPLICATIONS

This application claims the benefit of U.S. Provisional Application No. 63/271,840, filed Oct. 26, 2021, entitled "LENS SPACERS FOR LENS STABILITY", which is assigned to the assignee hereof, and incorporated herein in its entirety by reference.

BACKGROUND

Camera lenses, or other miniature lenses, often have multiple lens elements positioned within a barrel. It is important to maintain space between two adjacent lenses (e.g., which are positioned vertically within the barrel), because air space between the lenses is important for preventing unwanted light reflections and transmissions. However, it can be difficult to maintain separation between the lenses, particularly during cases when the camera lens is utilized in a high-vibration environment.

Accordingly, methods, systems, and techniques for improving lens spacers for lens stability are desirable.

SUMMARY

Spacers for lens apparatuses are provided.

In some embodiments, a spacer for a lens apparatus comprises: an inner circumference and an outer circumference; and one or more angled vertical components, each positioned along the outer circumference. In some embodiments: the spacer is configured to be positioned between two lenses of the lens apparatus; a region within the inner circumference is configured to allow light to pass between the two lenses; and an angled vertical component of the one or more angled vertical components is positioned against an angled surface of at least one of the two lenses.

In some examples, the angled surface is a chamfered flange.

In some examples, the angled vertical component has an angle that corresponds to an angle of the angled surface.

In some examples, the angled vertical component has an upward bend and/or a downward bend.

In some examples, a region between the inner circumference and the outer circumference is plastic.

In some examples, a region between the inner circumference and the outer circumference is metal.

In some examples, the angled vertical component is configured to restrict lateral movement of the spacer within the lens apparatus.

In some embodiments, a spacer for a lens apparatus comprises: an inner circumference and an outer circumference; and one or more protrusions, each positioned along the outer circumference. In some embodiments: the spacer is configured to be positioned between two lenses of the lens apparatus; a region within the inner circumference is configured to allow light to pass between the two lenses; and a protrusion of the one or more protrusions is configured to fit within an inner portion of at least one of the two lenses.

In some examples, the protrusion of the one or more protrusions is configured to fit into a gap between the outer circumference and the inner portion of the at least one of the two lenses.

In some examples, the protrusion has a cantilevered shape.

In some examples, the protrusion has a semi-circular shape.

In some examples, the one or more protrusions are distributed around the outer circumference in a symmetric manner.

In some examples, the one or more protrusions have a same shape.

In some embodiments, a lens apparatus comprises: two or more lenses, wherein a first lens of the two or more lenses is positioned above a second lens of the two or more lenses; a spacer positioned between the first lens and the second lens; and one or more dome structures, wherein each dome structure contacts the spacer and one of the first lens or the second lens.

In some examples, the one or more dome structures comprises an adhesive. In some examples, the adhesive comprises epoxy. In some examples, the one or more dome structures are deposited on a surface of the first lens that is in contact with the spacer. In some examples, the one or more dome structures are deposited on a surface of the spacer that is in contact with the second lens.

In some examples, the one or more dome structures comprise dimples in the first lens. In some examples, the first lens is constructed using a mold that includes the dimples.

BRIEF DESCRIPTION OF THE DRAWINGS

Illustrative embodiments are described in detail below with reference to the following figures.

Figure 1:
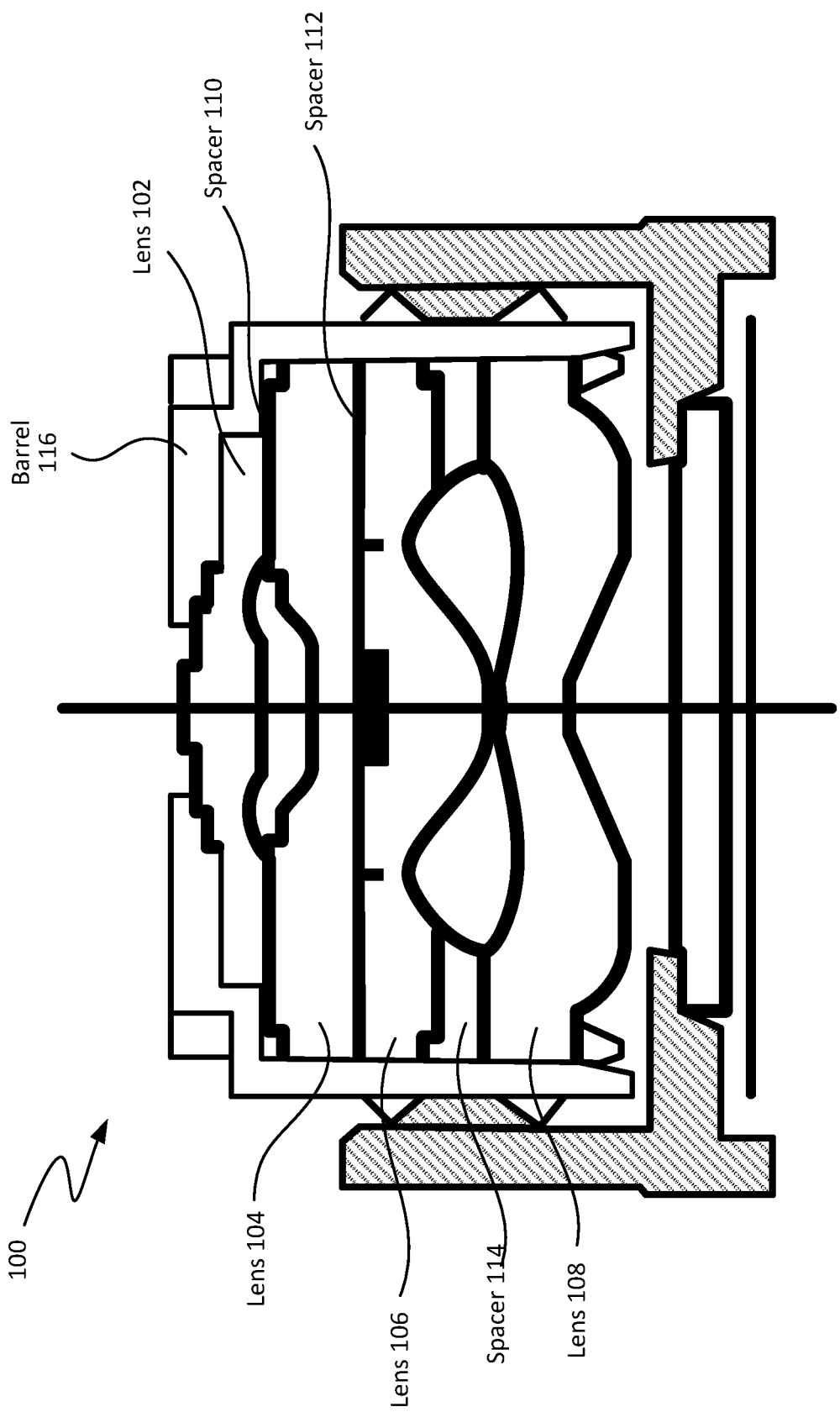
FIG. 1 depicts a cross-sectional front view of a lens apparatus in accordance with some embodiments.

The figures depict embodiments of the present disclosure for purposes of illustration only. One skilled in the art will readily recognize from the following description that alternative embodiments of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Lens apparatuses (e.g., for camera lenses or other miniature lenses), often have multiple lens elements positioned within a barrel. It is important to maintain space between two lenses (e.g., which are positioned vertically within the barrel), because air space between the lenses is important for preventing unwanted light reflections and transmissions. Spacers are commonly used to maintain space between the lenses. Spacers are often shaped like washers—round in circumference, where the washer edge is positioned between two adjacent lenses. The spacers may be metal or plastic, depending on the thickness required of the spacer.

Spacers may be shifted during operation of the device. For example, a spacer may be shifted due to vibration of the device, e.g., for a camera lens positioned on a vehicle. As another example, a metal spacer may be shifted due to magnetic effects of an actuator (e.g., a voice coil motor (VCM)). Shifting spacers are problematic, because they may cause decentering or tilting of the lens, a change in relative illumination and/or optical center, and/or or clipping of incoming rays from an object. Spacers and their function within lens apparatuses are shown in and described below in connection with FIGS. 1, 2A, 2B, and 2C.

Described herein are various techniques and spacer designs for reducing and/or ameliorating spacer shift. For example, in some implementations, a spacer may have an angled vertical component that is configured to be positioned adjacent to a chamfered flange of a lens and/or between two chamfered flanges of adjacent lenses, as shown in and described below in connection with FIGS. 3A and 3B. It should be noted that, as used herein, "vertical" refers to an angle having a vertical component, e.g., a non-horizontal angle. Such a vertical component may be at a 90 degree angle, an 80 degree angle, a 70 degree angle, or any other suitable non-horizontal angle. By curving around a chamfered flange of a lens, the spacer may be held in place, and lateral shifts of the spacer may be restricted. As another example, in some implementations, a spacer may have protrusions that protrude into a space or gap between the lens and the spacer, as shown in and described below in connection with FIGS. 4A and 4B. The protrusion may serve as a spring that pushes the spacer back into a central position responsive to lateral shifts, thereby ameliorating spacer shifts. As yet another example, in some embodiments, a dome structure may be part of or disposed on a lens or spacer, as shown in and described below in connection with FIGS. 5A, 5B, 5C, 5D, 6A, and 6B. The dome structure may be a droplet of glue, epoxy, or other adhesive. The dome structure may serve to tightly couple the spacer and two lenses on either side of the spacer, thereby restricting lateral movement of the spacer. Note that, as used herein, "dome" may refer to a surface protrusion having any suitable shape, such as a hemisphere, conical, pyramidal, cylindrical, or the like.

FIG. 1 shows a cross-sectional front view of a lens apparatus 100 in accordance with some implementations. As illustrated, lens apparatus 100 includes multiple lenses, such as lens 102, 104, 106, and 108. The multiple lenses are positioned vertically stacked within a barrel 116. Adjacent lenses are separated by spacers, which serve to maintain a spatial separation between the lenses. For example, spacers may maintain and support air space between two adjacent lenses, which may reduce unwanted light reflection, transmission, and/or flare. As illustrated in FIG. 1, lenses 102 and 104 are separated by spacer 110, lenses 104 and 106 are separated by spacer 112, and lenses 106 and 108 are separated by spacer 114. The lenses, and their corresponding spacers, are all housed within barrel 116.

Figure 2A:
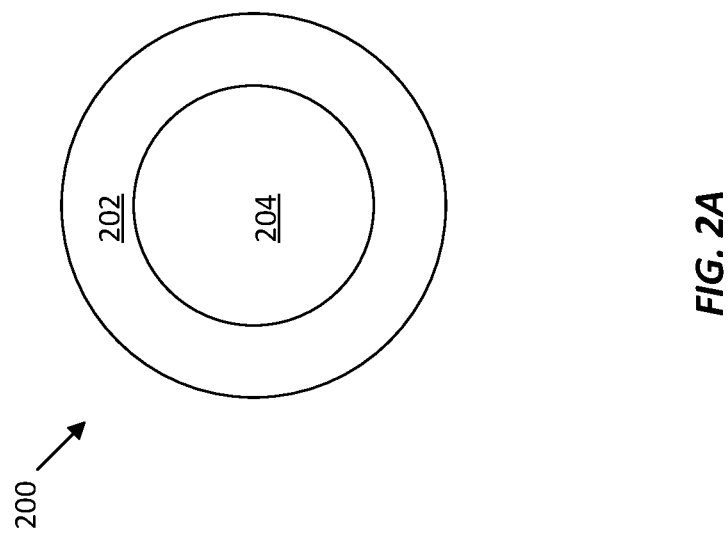
FIGS. 2A-2C depict spacers and usage of spacer between lenses of a lens apparatus in accordance with some embodiments.

Conventional techniques utilize a spacer that is shaped like a washer. The spacer may have a smooth circumference, with an inner hole, that coincides with where light passes between lenses. The outer edge may be placed between two adjacent lenses such that the outer edge serves to maintain a space between the two lenses. The spacer may be made of plastic or metal. The material of the spacer may depend on a required thickness of the spacer. FIG. 2A shows a top view of a conventionally-shaped spacer 200. As illustrated, portions of outer edge 202 may fit between edges of two adjacent lenses, while light may pass through inner portion 204.

A spacer may be shifted, for example, during operation of a device that includes a lens apparatus. For example, a spacer may be shifted due to vibration. As a more particular example, in instances in which a lens apparatus operates in a high-vibration environment, such as on a vehicle (e.g., a motorcycle, a car, a truck, an airplane, etc.), the spacer may shift in place due to vibration. As another example, a spacer may be shifted due to magnetic forces, such as from a VCM. Shifting of the spacer may reduce air space between two adjacent lenses, which may cause clipping of incoming rays from an object, decentering and tilt of the lens(es), a change in relative illumination (RI), and/or a change in optical center (OC).

Figure 2C:
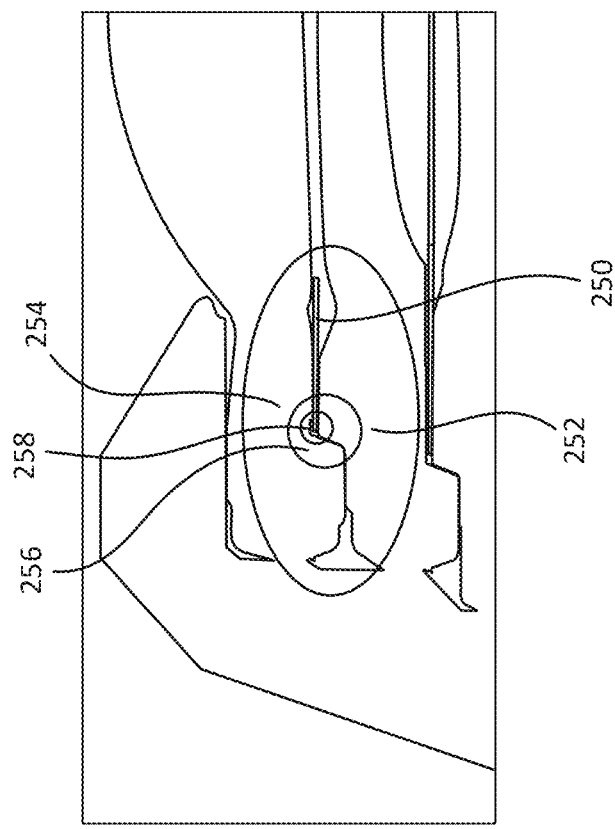
Figure 2B:
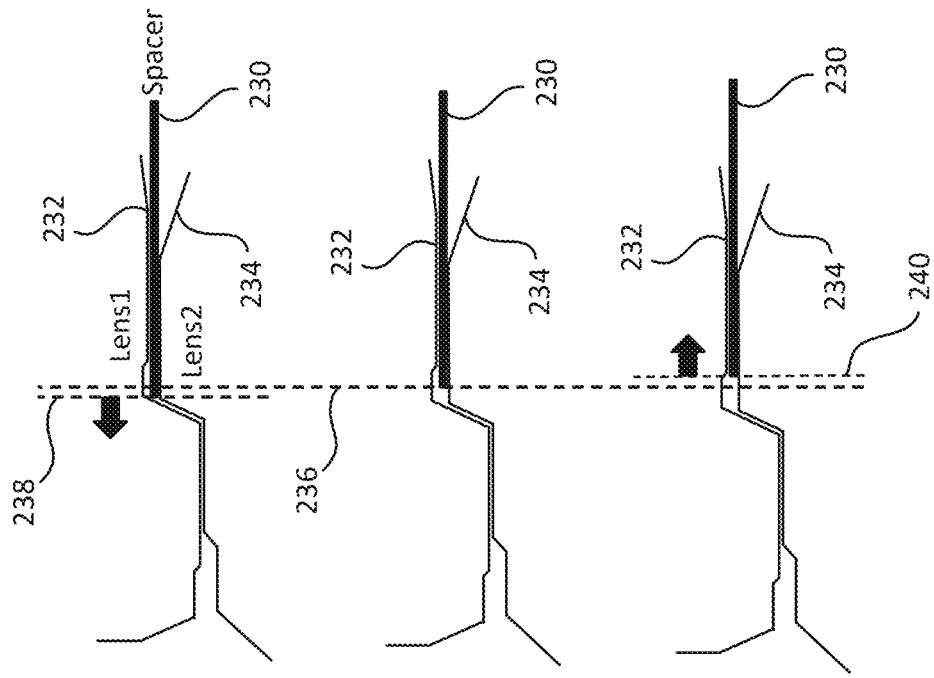

FIG. 2B shows a schematic diagram that illustrates spacer shifting from a cross-sectional front view. As illustrated, a spacer 230 separates a first lens 232 and a second lens 234. Spacer 230 may ideally be positioned at position 236. However, due to external forces (e.g., vibration, magnetic forces, etc.), spacer 230 may shift leftward to position 238 and/or rightward to position 240. The shift may cause a separation between lens 232 and 234 to change beyond a desired air space amount, leading to unwanted effects.

FIG. 2C shows a portion of a cross-sectional front view of a lens apparatus. As illustrated, a spacer 250 separates a first lens 252 and a second lens 254. Conventional techniques sometimes increase a thickness of a spacer in order to provide more buffer for air space between the two lenses, such that, even if the spacer shifts in position, air space is maintained due to the increased thickness of the spacer. However, lenses frequently have chamfered flanges such that the edges of two adjacent lenses are "entangled." For example, lens 252 and lens 254 have chamfered flanges, such that, when stacked, the chamfered flanges produce entanglement 256. Increasing a thickness of spacer 250 would cause entanglement 256 to no longer be maintained, by causing the chamfered flanges of lens 252 and lens 254 to no longer interlock.

FIG. 2C also depicts a lens-to-spacer clearance 258, which corresponds to a gap between an outer edge of the spacer and the inner edge of lens 254. Lens-to-spacer clearance 258 allows the spacer to shift. However, increasing a diameter of spacer 250 would cause the spacer to obstruct portions of lens 252 and/or 254 used for visualizing objects. It should be noted that dimensions of a lens-to-spacer clearance may be a specification of the lens apparatus, and, without a gap of some size, the lens apparatus may not be able to be manufactured. Accordingly, the gap itself may not be able to be eliminated, and may undesirably provide room for the spacer to shift.

In some implementations, an outer edge of a spacer may have one or more angled vertical components. For example, an angled vertical component may have an angle that corresponds to an angle of a chamfered flange of a lens, such that the angled vertical component of the spacer may be positioned adjacent to the chamfered flange (e.g., by curving around the chamfered flange). The angled vertical component(s) of the spacer may therefore prevent shifting of the spacer by effectively "locking" the spacer in position. An angle of an angled vertical component may be within a range of about 1 degree-70 degrees (e.g., 20 degrees, 45 degrees, 60 degrees, or the like). In some implementations, an angled vertical component may provide restriction of lateral movement of the spacer. A spacer with an angled vertical component may be made of any suitable material, such as metal or plastic. In some embodiments, in instances in which the spacer is made of plastic, the plastic may be a flexible plastic such that edge portions of the spacer can be bent to form the angled vertical component at a suitable angle (i.e., that corresponds to an angle of a chamfered flange of a lens).

Figure 3A:
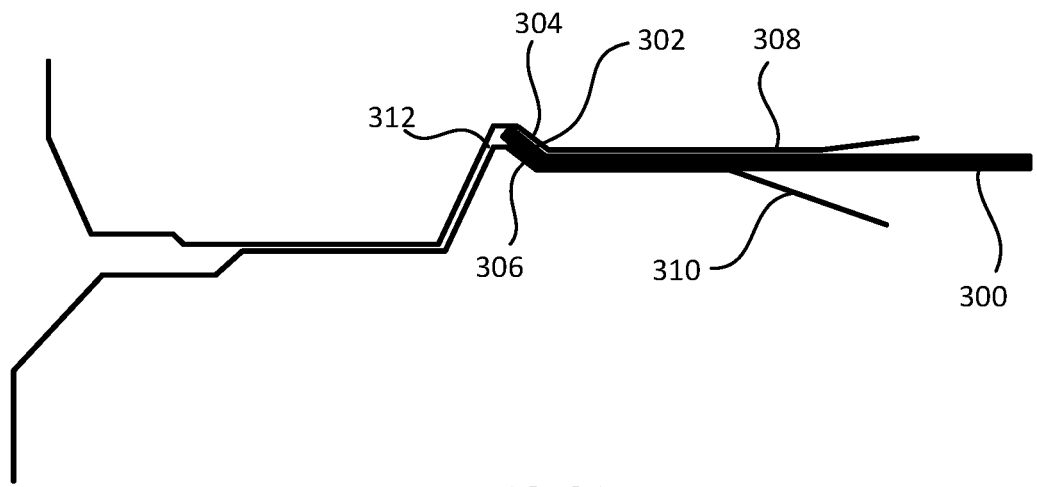
FIGS. 3A and 3B show examples of spacers with an angled vertical component in accordance with some embodiments.

Turning to FIG. 3A, a schematic diagram that illustrates use of a spacer with an angled vertical component is shown in accordance with some implementations. As illustrated, spacer 300 has an angled vertical component 302. Angled vertical component 302 has an angle corresponding to angles of chamfered flange 304 of lens 308 and chamfered flange 306 of lens 310. For example, as illustrated, the angle of angled vertical component 302 is substantially similar to the angles of chamfered flange 304 and chamfered flange 306. It should be noted that although spacer 300 is shown with an angled vertical component with one turn or bend, it some implementations, an angled vertical component may have two or more turns or bends. For example, in some implementations, spacer 300 can have a second turn or bend that protrudes into space 312. It should be noted that, although angled vertical component 302 is shown as a straight or linear shape, in some embodiments, an angled vertical component 302 may have at least a portion that is curved in shape.

Figure 3B:
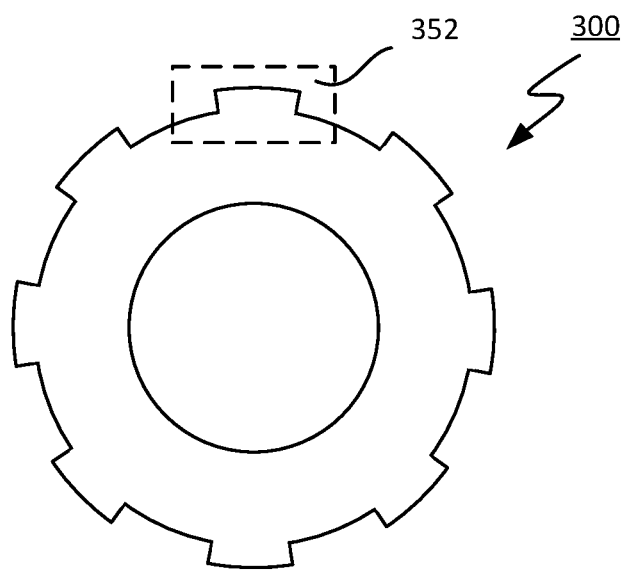

Turning to FIG. 3B, a top view of spacer 300 is shown in accordance with some implementations. Angled vertical component 352 is an example of an angled vertical component that may be configured to fit adjacent to a chamfered flange of a lens and/or between two chamfered flanges of two adjacent lenses. It should be noted that although spacer 300 is shown as having eight angled vertical components, this is merely exemplary, and, in some embodiments, a spacer may have any suitable number of angled vertical components (e.g., two, four, five, ten, or the like).

In some implementations, a spacer may have one or more protrusions that protrude into a gap between the spacer and an inner lens portion (e.g., lens-to-spacer clearance 258, as shown in and described above in connection with FIG. 2C). In some embodiments, a protrusion may effectively function as a spring that moves a spacer back into position when the spacer shifts laterally. For example, responsive to the spacer being shifted laterally in one direction, the protrusion may contact the inner lens portion, which may then cause the spacer to be pushed back to the centered position. In some implementations, the spacer may have multiple protrusions on the outer edge of the spacer, thereby allowing the spacer to be shifted back into position due to laterals shifts in multiple corresponding directions. In some implementations, the multiple protrusions may be symmetrically distributed around the outer edge of the spacer such that lateral shifts are symmetrically and evenly compensated. A protrusion may have any suitable shape. For example, in some implementations, a protrusion may have a cantilevered edge, which may provide tension for manipulating a shifted spacer back into a centered position. As another example, in some implementations, a protrusion may have a curved (e.g., semi-circular) shape.

Figure 4A:
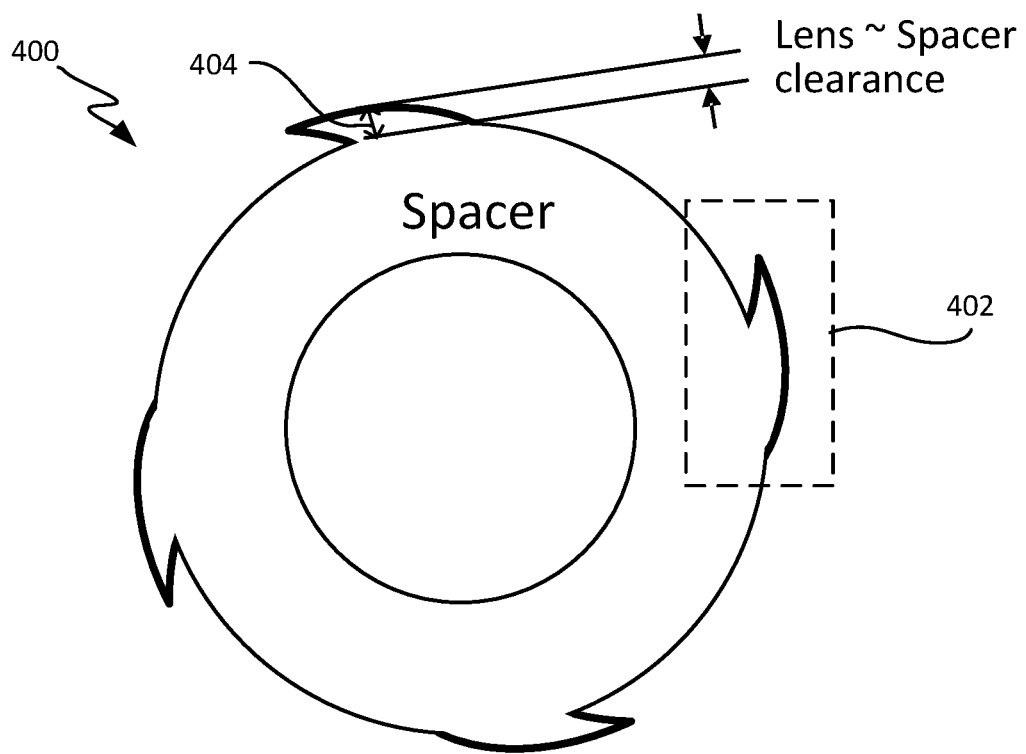
FIGS. 4A and 4B show examples of spacers with symmetric protrusions in accordance with some embodiments.
Figure 4B:
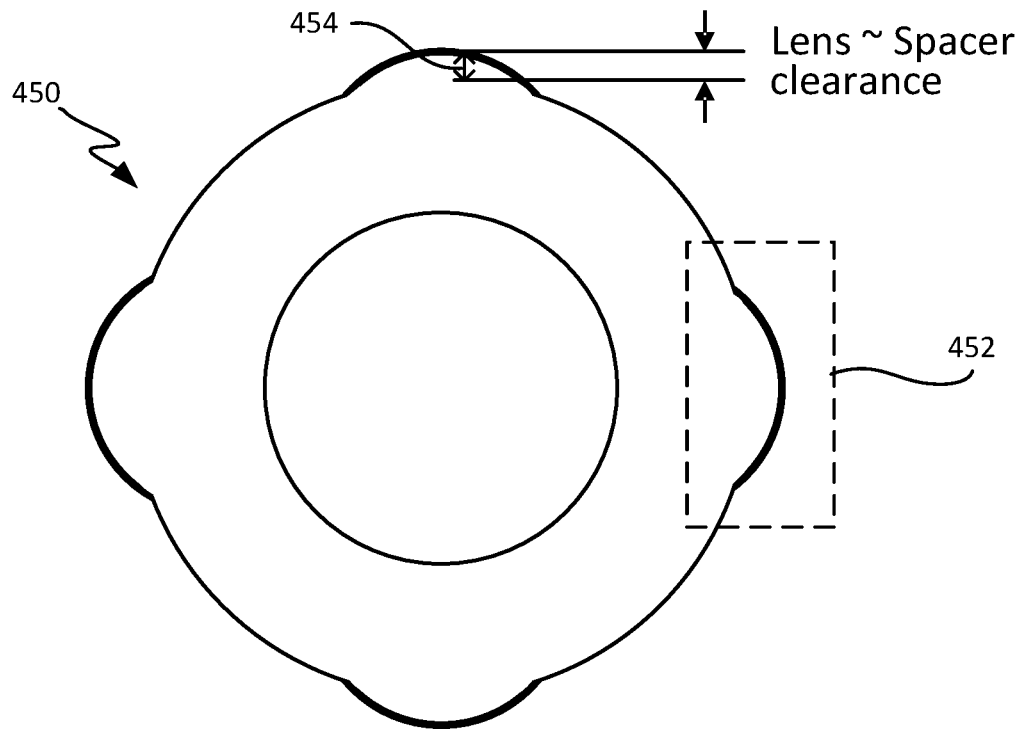

FIGS. 4A and 4B depict various implementations of spacers with protrusions in accordance with some embodiments. For example, spacer 400 of FIG. 4A includes three cantilevered protrusions, such as protrusion 402. In some implementations, a width 404 of a protrusion (e.g., at a widest part of the cantilevered protrusion) is substantially similar to a size of the gap between the circumference of the spacer and the inner portion of the lens (i.e., the lens-to-spacer clearance, as shown in and discussed above in connection with FIG. 2C), thereby allowing the cantilevered protrusion to fit snugly in the lens-to-spacer gap. It should be noted that although spacer 400 includes 3 cantilevered protrusions, this is merely exemplary, and spacer 400 may include any suitable number of cantilevered protrusions (e.g., 2, 4, 5, 7, or the like).

As another example, spacer 450 of FIG. 4B includes four semi-circular protrusions, such as protrusion 452. In some implementations, a width 454 of a protrusion (e.g., corresponding to a dimeter of the semi-circular protrusion) is substantially similar to a size of a the gap between the circumference of the spacer and the inner portion of the lens (i.e., the lens-to-spacer clearance, as shown in and discussed above in connection with FIG. 2C), thereby allowing the protrusion to fit snugly in the lens-to-spacer gap. It should be noted that although spacer 450 includes 4 protrusions, this is merely exemplary, and spacer 450 may include any suitable number of protrusions (e.g., 2, 4, 5, 7, or the like).

In some implementations, a spacer may have protrusions that differ in shape from each other. For example, in some embodiments, a spacer may have two protrusions having a cantilevered shape, and two protrusions having a semi-circular shape.

In some implementations, a dome structure can be used to make a spacer tightly contact a lens. For example, the spacer and the lens may be pressed together more tightly due to the dome structure, thereby causing the spacer to be held tightly in place and reducing lateral spacer shift. In some embodiments, the dome structure may be part of and/or disposed on the lens structure. Alternatively, in some embodiments, the dome structure may be disposed on the spacer. In some embodiments, the dome structure may be correspond to a dimple or "missing" portion of the lens, as shown in and described below in connection with FIG. 5B. In some such embodiments, the lens may be constructed using plastic injection molding. In some embodiments, the dome structure may be disposed on the lens structure or on the spacer using an adhesive, such as glue or epoxy, as shown in and described below in connection with FIGS. 5C and 5D. The dome structure may be deposited using, for example, a glue dispenser machine or other equipment for which the size of a drop of glue or epoxy may be precisely controlled.

Figure 5A:
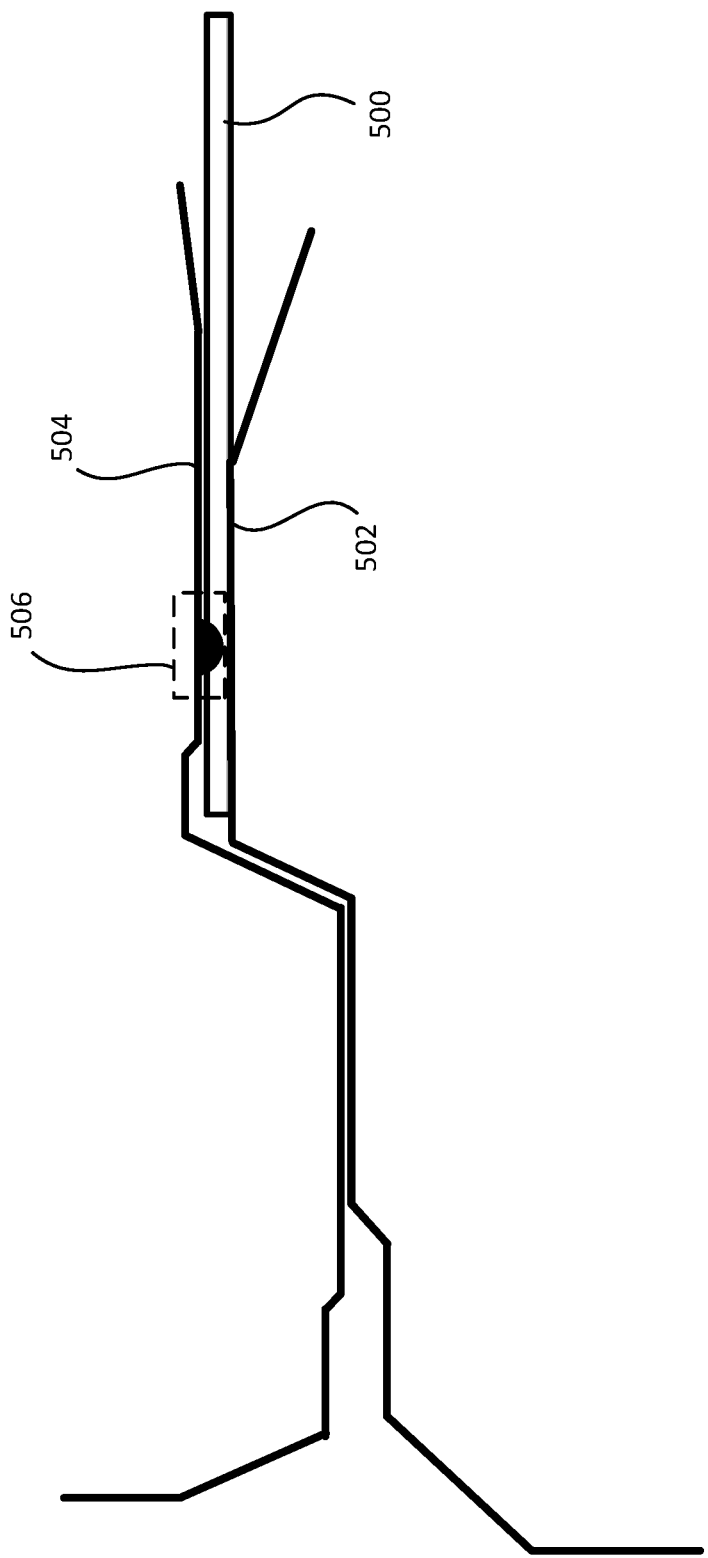
FIG. 5A shows a schematic diagram of a side view of a dome structure that facilitates a connection between lenses and a spacer in accordance with some embodiments.

Turning to FIG. 5A, an example of use of a dome structure that is on a lens structure is shown in accordance with some embodiments. As illustrated, a spacer 500 separates a lens 502 from a lens 504. A dome structure 506 is deposited on a bottom surface of lens 504 that is in contact with spacer 500. Dome structure 506 thereby applies pressure to spacer 500, causing spacer 500 to be sandwiched tightly between lens 502 and lens 504, thereby restricting spacer 500 from lateral shifts.

Figure 5D:
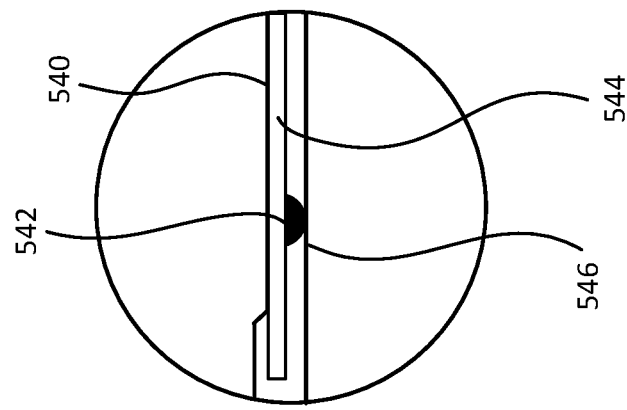
FIGS. 5B-5D show example implementations of a dome structure in accordance with some embodiments.
Figure 5C:
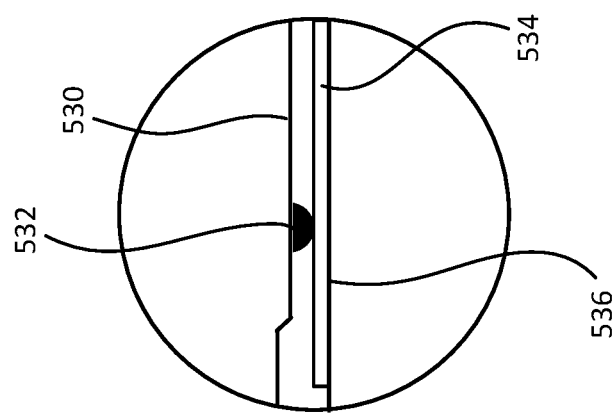
Figure 5B:
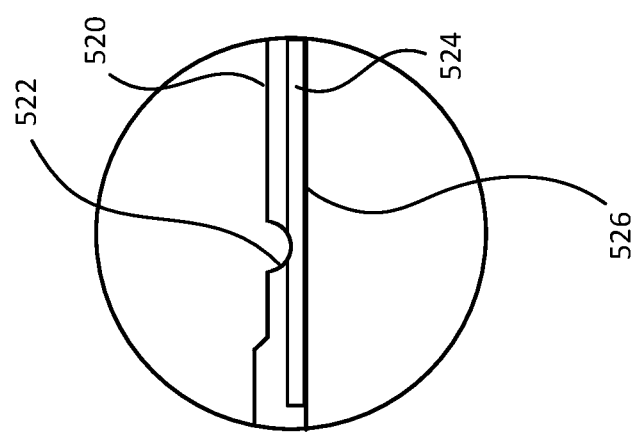

FIG. 5B depicts an example of a dome structure formed as part of a lens. In particular, a portion of lens 520 has a dome structure 522, which is a dimple in lens 520. Lens 520, including dome structure 522, may be formed using a mold. For example, lens 520 may be formed using plastic injection molding. As another example, lens 520 may be formed as molded glass. It should be noted that, in some implementations, to precisely control dimensions of dome structure 522, the mold may be created using a diamond tip. Dome structure 522 may press down on spacer 524 which is positioned below lens 520, thereby applying pressure to spacer 524, which in turn tightly contacts lens 526. This may cause spacer 524 to be held in position tightly, restricting lateral movement or shifts of spacer 524.

FIG. 5C depicts an example of a dome structure deposited on a lens in accordance with some embodiments. As illustrated, a dome structure 532 is deposited on or disposed on a bottom surface of lens 530. Dome structure 532 may be formed from glue, epoxy, or another depositable adhesive. Dome structure 532 may press down on spacer 534, which is positioned below lens 530, thereby applying pressure to spacer 534, which in turn tightly contacts lens 536. This may cause spacer 534 to be held in position tightly, restricting lateral movement of spacer 534.

FIG. 5D depicts an example of a dome structure deposited on a spacer in accordance with some embodiments. As illustrated, a spacer 544 is positioned in contact with a bottom surface of lens 540. A dome structure 542 is deposited on or disposed on a bottom surface of spacer 544. Dome structure 542 may be formed from glue, epoxy, or another depositable adhesive. Dome structure 542 may press down on lens 546. This may cause spacer 544 to be held in position tightly, restricting lateral movement of spacer 544.

Figure 6A:
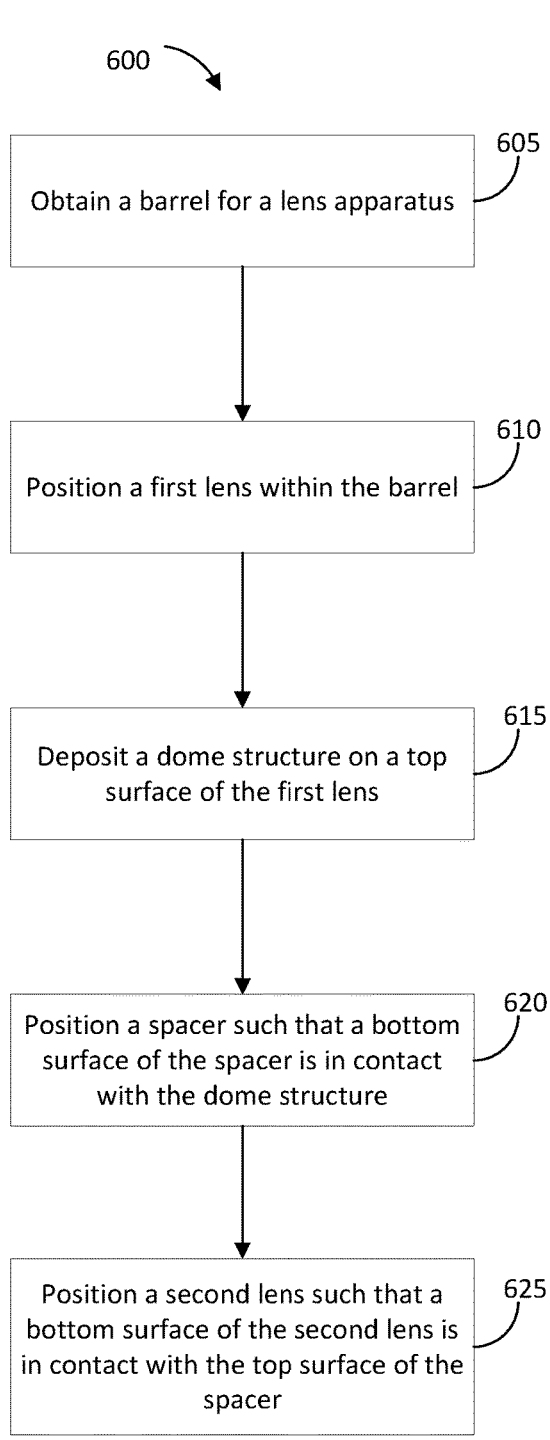
FIG. 6A shows an example of a process for assembling a lens apparatus that includes an epoxy dome structure on a lens in accordance with some embodiments.
Figure 6A:
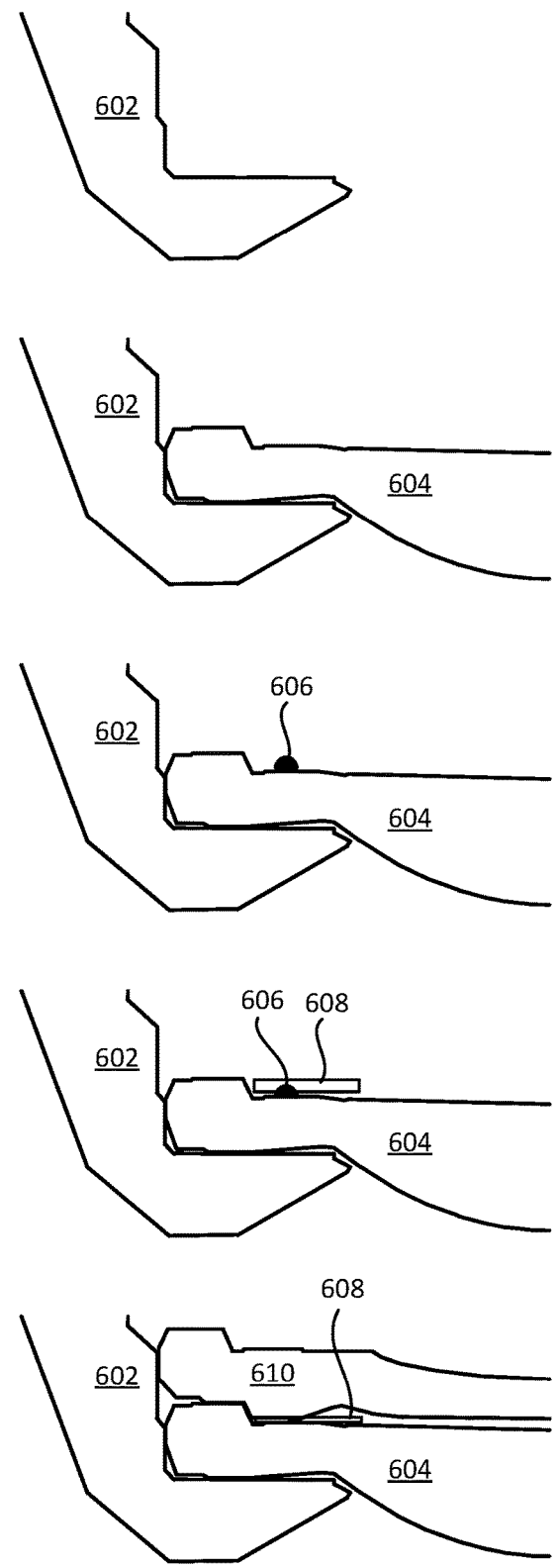

FIG. 6A shows an example of a process 600 for constructing a portion of a lens apparatus that includes a dome structure deposited on a lens in accordance with some implementations. Process 600 may be performed during construction of a lens apparatus.

At block 605, a barrel for a lens apparatus is obtained. A portion of an example barrel 602 is depicted in FIG. 6A.

At block 610, a first lens is positioned within the barrel. An example of a first lens 604 positioned within barrel 602 is depicted in FIG. 6A. As illustrated, a portion of the first lens (e.g., an end portion or an edge portion) may be in contact with a portion of barrel 602 such that first lens 604 rests in barrel 602.

At block 615, a dome structure is deposited on a top surface of the first lens. For example, FIG. 6A illustrates dome structure 606 deposited on a top surface of first lens 604. In some embodiments, the dome structure may be glue, epoxy, or any other suitable adhesive. In some embodiments, the dome structure may be deposited by an adhesive dispensing machine that precisely controls a size of the adhesive droplet. In some embodiments, multiple dome structures (e.g., two, four, five, eight, etc.) are deposited on the top surface of the first lens, for example, along an outer edge portion of the first lens.

At block 620, a spacer is positioned such that a bottom surface of the spacer is in contact with the dome structure. For example, FIG. 6A illustrates a spacer 608 with a bottom surface in contact with dome structure 606. It should be noted that only a portion of a spacer is shown in FIG. 6A. In some implementations, in instances in which multiple dome structures are deposited on the first lens, the multiple dome structures may each contact the bottom surface of the spacer at different positions.

At block 625, a second lens is positioned such that a bottom surface of the second lens is in contact with the top surface of the spacer. For example, FIG. 6A illustrates a second lens 610 with a bottom surface in contact with spacer 608. Because the spacer is tightly pressing on the first lens via the adhesive dome structure, and because the second lens also applies pressure on the spacer, the spacer is restricted from lateral movements.

Figure 6B:
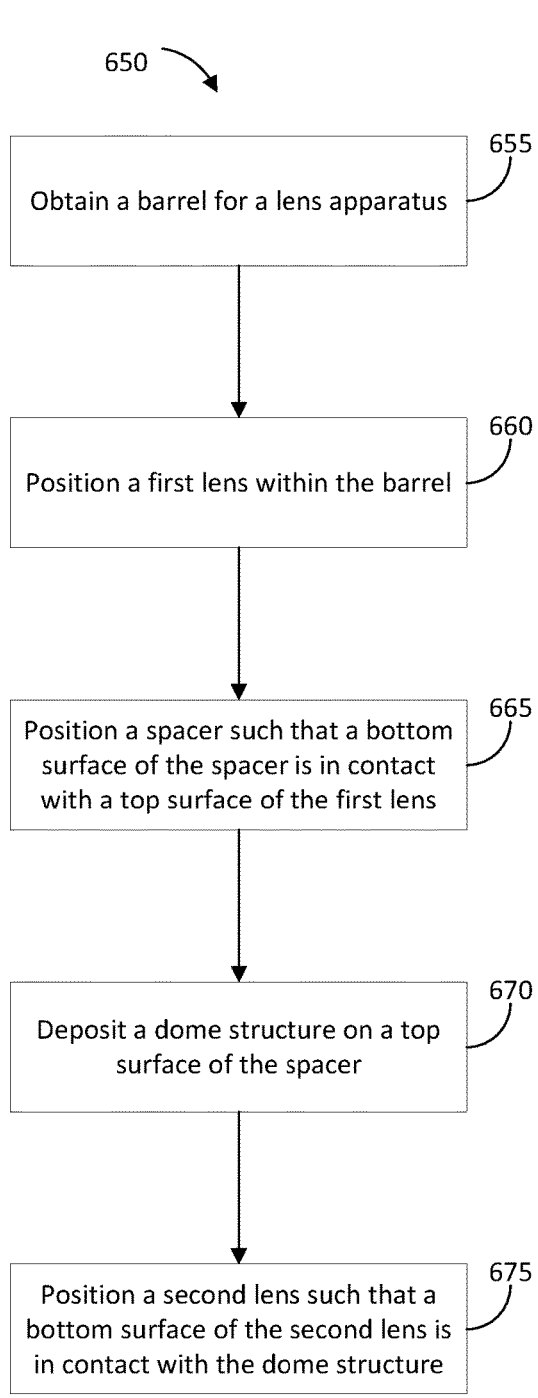
FIG. 6B shows an example of a process for assembling a lens apparatus that includes an epoxy dome structure on a spacer between lenses in accordance with some embodiments.
Figure 6B:
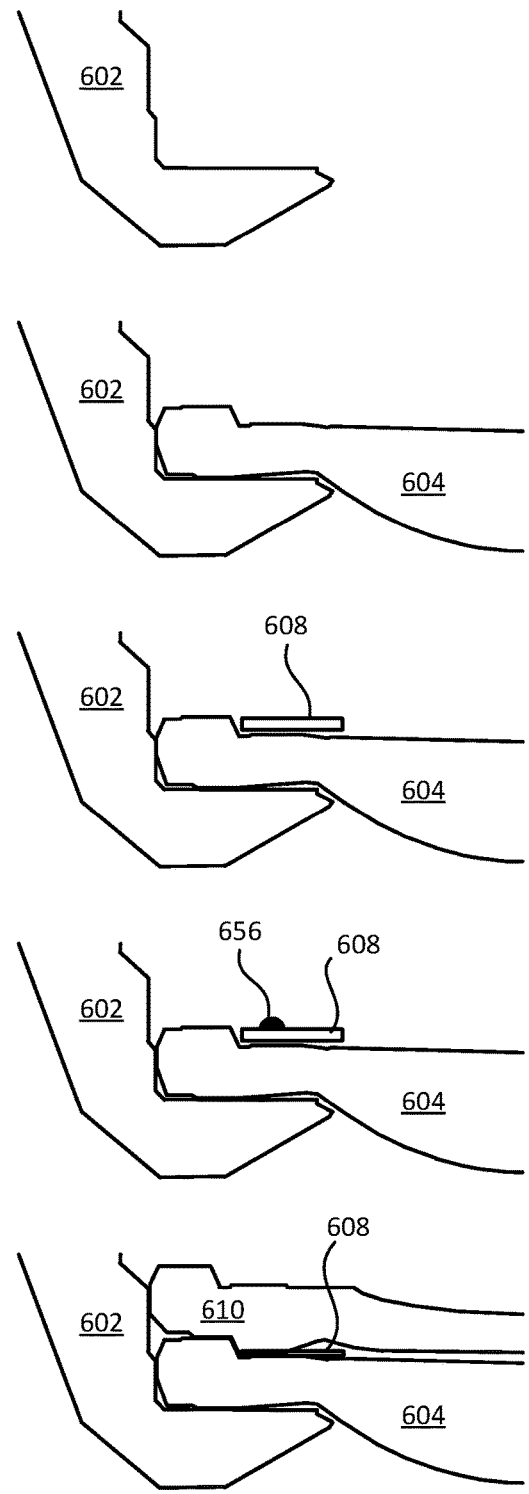

FIG. 6B shows an example of a process 650 for constructing a portion of a lens apparatus that includes a dome structure deposited on a spacer in accordance with some implementations. Process 650 may be performed during construction of a lens apparatus.

At block 655, a barrel for a lens apparatus is obtained. A portion of an example barrel 602 is depicted in FIG. 6B.

At block 660, a first lens is positioned within the barrel. An example of a first lens 604 positioned within barrel 602 is depicted in FIG. 6B. As illustrated, a portion of the first lens (e.g., an end portion or an edge portion) may be in contact with a portion of barrel 602 such that first lens 604 rests in barrel 602.

At block 665, a spacer is positioned such that a bottom surface of the spacer is in contact with a top surface of the first lens. For example, FIG. 6B illustrates a spacer 608 with a bottom surface in contact with a top surface of first lens 604. It should be noted that only a portion of a spacer is shown in FIG. 6B.

At block 670, a dome structure is deposited on a top surface of the spacer. For example, FIG. 6B illustrates dome structure 656 deposited on a top surface of spacer 608. In some embodiments, the dome structure may be glue, epoxy, or any other suitable adhesive. In some embodiments, the dome structure may be deposited by an adhesive dispensing machine that precisely controls a size of the adhesive droplet. In some embodiments, multiple dome structures (e.g., two, four, five, eight, etc.) are deposited on the top surface of the first lens.

At block 675, a second lens is positioned such that a bottom surface of the second lens is in contact with the dome surface on the spacer. For example, FIG. 6B illustrates a second lens 610 with a bottom surface in contact with dome structure 656 on spacer 608. Because the spacer is tightly pressing on the second lens via the adhesive dome structure, and because the first lens also applies pressure on the spacer, the spacer is restricted from lateral movements.

It should be noted that, in some implementations, various spacer designs and/or lens apparatus designs may be combined. For example, in some embodiments, a spacer may have angled vertical components that are configured to curve around a chamfered flange of a lens (e.g., as shown in and described above in connection with FIGS. 3A and 3B), and, one or more dome structures may be part of or disposed on a lens or spacer (e.g., as shown in and described above in connection with FIGS. 5A, 5B, 5C, 5D, 6A, and 6B).

The lens apparatuses described herein may be used in conjunction with various technologies, such as an artificial reality system. An artificial reality system, such as a head-mounted display (HMD) or heads-up display (HUD) system, generally includes a display configured to present artificial images that depict objects in a virtual environment. The display may present virtual objects or combine images of real objects with virtual objects, as in virtual reality (VR), augmented reality (AR), or mixed reality (MR) applications. For example, in an AR system, a user may view both displayed images of virtual objects (e.g., computer-generated images (CGIs)) and the surrounding environment by, for example, seeing through transparent display glasses or lenses (often referred to as optical see-through) or viewing displayed images of the surrounding environment captured by a camera (often referred to as video see-through). In some AR systems, the artificial images may be presented to users using an LED-based display subsystem.

In some embodiments, the apparatuses described herein may be integrated into an HMD. For example, such an HMD may include one or more light emitters and/or one or more light sensors incorporated into a portion of a frame of the HMD such that light can be emitted toward a tissue of a wearer of the HMD that is proximate to or touching the portion of the frame of the HMD. Example locations of such a portion of a frame of an HMD may include a portion configured to be proximate to an ear of the wearer (e.g., proximate to a superior tragus, proximate to a superior auricular, proximate to a posterior auricular, proximate to an inferior auricular, or the like), proximate to a forehead of the wearer, or the like. It should be noted that multiple sets of light emitters and light sensors may be incorporated into a frame of an HMD such that PPG can be determined from measurements associated with multiple body locations of a wearer of the HMD.

In the following description, for the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples. The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example" is not necessarily to be construed as preferred or advantageous over other embodiments or designs.

Embodiments disclosed herein may be used to implement components of an artificial reality system or may be implemented in conjunction with an artificial reality system. Artificial reality is a form of reality that has been adjusted in some manner before presentation to a user, which may include, for example, a virtual reality, an augmented reality, a mixed reality, a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, for example, create content in an artificial reality and/or are otherwise used in (e.g., perform activities in) an artificial reality. The artificial reality system that provides the artificial reality content may be implemented on various platforms, including an HMD connected to a host computer system, a standalone HMD, a mobile device or computing system, or any other hardware platform capable of providing artificial reality content to one or more viewers.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, systems, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing various embodiments. Various changes may be made in the function and arrangement of elements without departing from the spirit and scope of the present disclosure.

Also, some embodiments were described as processes depicted as flow diagrams or block diagrams. Although each may describe the operations as a sequential process, many of the operations may be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

It will be apparent to those skilled in the art that substantial variations may be made in accordance with specific requirements. For example, customized or special-purpose hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" may refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media such as compact disk (CD) or digital versatile disk (DVD), punch cards, paper tape, any other physical medium with patterns of holes, a RAM, a programmable read-only memory (PROM), an erasable programmable read-only memory (EPROM), a FLASH-EPROM, any other memory chip or cartridge, a carrier wave as described hereinafter, or any other medium from which a computer can read instructions and/or code. A computer program product may include code and/or machine-executable instructions that may represent a procedure, a function, a subprogram, a program, a routine, an application (App), a subroutine, a module, a software package, a class, or any combination of instructions, data structures, or program statements.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms, "and" and "or" as used herein, may include a variety of meanings that are also expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AC, BC, AA, ABC, AAB, AABBCCC, etc.

Further, while certain embodiments have been described using a particular combination of hardware and software, it should be recognized that other combinations of hardware and software are also possible. Certain embodiments may be implemented only in hardware, or only in software, or using combinations thereof. In one example, software may be implemented with a computer program product containing computer program code or instructions executable by one or more processors for performing any or all of the steps, operations, or processes described in this disclosure, where the computer program may be stored on a non-transitory computer readable medium. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques, including, but not limited to, conventional techniques for inter-process communications, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

The invention claimed is:

1. A spacer for a lens apparatus, comprising:
an inner circumference and an outer circumference; and
one or more angled vertical components, each positioned along the outer circumference, wherein:
the spacer is configured to be positioned between one or more dome structures that comprise dimples in at least one of two lenses of the lens apparatus,
a region within the inner circumference is configured to allow light to pass between the two lenses, and
an angled vertical component of the one or more angled vertical components is positioned against an angled surface of the at least one of the two lenses.

2. The spacer of claim 1, wherein the angled surface is a chamfered flange.

3. The spacer of claim 1, wherein the angled vertical component has an angle that corresponds to an angle of the angled surface.

4. The spacer of claim 1, wherein the angled vertical component has an upward bend and/or a downward bend.

5. The spacer of claim 1, wherein a region between the inner circumference and the outer circumference is plastic.

6. The spacer of claim 1, wherein a region between the inner circumference and the outer circumference is metal.

7. The spacer of claim 1, wherein the angled vertical component is configured to restrict lateral movement of the spacer within the lens apparatus.

8. A spacer for a lens apparatus, comprising:
an inner circumference and an outer circumference; and
one or more protrusions, each positioned along the outer circumference, wherein:
the spacer is configured to be positioned between one or more dome structures that comprise dimples in at least one of two lenses of the lens apparatus,
a region within the inner circumference is configured to allow light to pass between the two lenses, and
a protrusion of the one or more protrusions is configured to fit within an inner portion of the at least one of the two lenses.

9. The spacer of claim 8, wherein the protrusion of the one or more protrusions is configured to fit into a gap between the outer circumference and the inner portion of the at least one of the two lenses.

10. The spacer of claim 8, wherein the protrusion has a cantilevered shape.

11. The spacer of claim 8, wherein the protrusion has a semi-circular shape.

12. The spacer of claim 8, wherein the one or more protrusions are distributed around the outer circumference in a symmetric manner.

13. The spacer of claim 8, wherein the one or more protrusions have a same shape.

14. A lens apparatus, comprising:
two or more lenses, wherein a first lens of the two or more lenses is positioned above a second lens of the two or more lenses;
a spacer positioned between the first lens and the second lens; and
one or more dome structures, wherein the one or more dome structures comprise dimples in at least one of the first lens or the second lens and each dome structure contacts the spacer and one of the first lens or the second lens.

15. The lens apparatus of claim 14, wherein the one or more dome structures comprises an adhesive.

16. The lens apparatus of claim 15, wherein the adhesive comprises epoxy.

17. The lens apparatus of claim 15, wherein the one or more dome structures are deposited on a surface of the first lens that is in contact with the spacer.

18. The lens apparatus of claim 15, wherein the one or more dome structures are deposited on a surface of the spacer that is in contact with the second lens.

19. The lens apparatus of claim 14, wherein the first lens is constructed using a mold that includes the dimples.

20. The lens apparatus of claim 19, wherein the mold including the dimples is created using a diamond tip.

* * * * *